United States Patent Office 2,823,169
Patented Feb. 11, 1958

2,823,169

SUBSTITUTED ALUMINUM ALCOHOLATES AND METHODS OF MAKING SAME

Peter M. Brown, Jr., Livingston, and Thomas Govett, Springfield, N. J., assignors to Reheis Company, Inc., a corporation of New York No Drawing. Application May 23, 1955
Serial No. 510,555

8 Claims. (Cl. 167—90)

This invention relates to substituted aluminum alcoholate complexes, the process of making them, and compositions containing them.

More particularly, the invention relates to aluminum alcoholate complexes containing chlorine or other halogen atoms replacing a part of the alcoholate groups normally attached to aluminum in simple alcoholates of the type formula $Al_n(OR)_{3n}$ in which $n$ is an integral number and R is an alkyl. The invention is particularly useful when the halogen in the finished product is chlorine and will be particularly illustrated, therefore, by description in connection with the use of chlorine as the halogen. In the embodiment of the invention of principal commercial interest, the substituted alcoholates contain also hydroxyl groups so that products of this type are aluminum chlorhydroxy alcoholates, the halogen, hydroxy, and the alcoholate groups being joined to the aluminum.

Briefly stated, the invention comprises a composition represented as to proportions of the components by the empirical formula $$Al_nCl_x(OH)_y(OR)_z$$

in which $n$, $x$, $y$ and $z$ are numbers, $x+y+z=3n$, and R is an alkyl group. In one embodiment $y$ is 0, so that the product in this instance is an aluminum chloralcoholate. We find, however, special advantages for deodorant use when $y$ has a substantial value, in other words, when hydroxyl is present.

Comprised also within the invention are compositions of the same general type but having another halogen substituted in equivalent proportion for the chlorine.

In a modification, the invention comprises a softener for the film left on evaporation of a solution of the complex. Another modification includes forming a gel by adding an excess of water to the complex in alcohol solution.

The process of the invention includes the interaction of aluminum metal with an aluminum halide in contact with an anhydrous alcohol and, in the commercial embodiment, in contact also with water in limited proportion.

We find that substituting the hydroxy group for a part of the alcoholate groups and thus reducing the alcoholate content increases the solubility in alcohol and various other similar organic liquids. As a result of this solubilizing effect, we may dissolve the aluminum chlorhydroxyalcoholate complex in large concentration in ethanol, for example, and then dilute this concentrated solution so made with such other organic liquids as Genetron 100, ethyl ether, benzene, chloroform, carbon tetrachloride, and kerosene or with softeners such as dipropylene glycol.

When the hydroxyl group is present in the complex and the alcohol represented is ethanol, solutions of the complex in alcohol or the like do not deposit decomposition products on storage. As a result, we may make satisfactorily stable solutions of aluminum chlorhydroxyethylate complexes in the solvents ordinarily used in the Aerosol type of solutions. Thus, we make a spray antiperspirant by mixing an ethyl alcohol solution of the aluminum chlorhydroxyethylate complex with Aerosol solvents. These are propellent solvents of vapor pressure above atmospheric at ordinary room temperatures. Examples are difluorethane (Genetron 100), difluormonochlorethane (Genetron 101), monofluortrichloromethane (Freon 11), or difluordichlormethane (Freon 12).

As to materials, the aluminum metal is used in finely divided or powdered elemental form, providing a large surface for reaction. In large batches the aluminum powder should also be added in increments at a rate to maintain reaction temperatures of 60°–75° C. without the use of external heat and without the aluminum powder reacting too violently at any time. Holding the temperature at or below 75° C. prevents undesired side reactions. Below 60° C., the rate or reaction is slowed.

The aluminum halide used is substantially anhydrous, examples being aluminum chloride, bromide and iodide. The chloride and iodide are the ones used for commercial purposes. The bromide is used only for purposes other than application to the skin.

The alcohol which is represented by the OR groups in the formula above is ordinarily ethanol. When R is ethyl, isopropyl, or t-butyl and a moderate proportion of hydroxyl is present, the complex is soluble to some extent or partially in ethanol. For purposes not requiring alcohol solubility of the product, we may use any one of the $C_1$–$C_8$ alcohols. Examples of alcohols that meet the requirements and that may be used are methanol, ethanol, n-propanol, isopropanol, and t-butanol.

For best results in the production of the chlorhydroxy complexes, the alcohol as reacted should be mixed with an appreciable but limited proportion of water.

Softeners for products left on evaporation of alcoholic solutions of our complexes are substantially non-volatile, anhydrous liquids that are soluble in alcohol and solvents for but chemically inert to the complexes. Examples that meet the requirements and illustrate the class of materials to be used as softeners are diethylene glycol, dipropylene glycol, dibutylene glycol, glycerine, polyglycerol, pentaerythritol, and sorbitol. All of these examples are polyhydric alcohols.

As to proportions of materials, we use the aluminum powder in proportion at least equivalent to the number of groups to be substituted in the aluminum halide. A suitable proportion is 4–12 atoms of aluminum to 1 molecule of aluminum halide, i. e. to the dimer molecule such as $Al_2Cl_6$. We find 10 atoms of aluminum a convenient proportion to use when the ratio Al:Cl is to be 1.9:1 in the product. Some excess insures reasonable speed of reaction in introducing the desired number of hydroxy and alcohol groups into the aluminum halide originally used.

The selected alcohol is introduced in amount to provide the proportion of alkoxy (OR) groups required in the finished product and ordinarily also to provide an excess to serve as the solvent for the product. Thus, we use to advantage 1–2.9 moles of ethanol for each atom of aluminum metal reacted increased by about 3 moles more of alcohol, to provide a vehicle for the reaction.

For the commercial embodiment in which we introduce hydroxy groups, to make the alcohol-soluble aluminum chlorhydroxyalcoholate, we use sufficient total water, added as such or as components of the other reagents, to provide about 2%–6% of the weight of the total alcohol or about 0.25 to 1 mole of water for each aluminum atom in the finished product. The concentration of water at the time of the reaction affects the composition of the complex made, more water decreasing the Al:Cl ratio. We get best results when we add 0.5%–2% water at the start of the reaction and the rest of the water after the reaction becomes slow. In representative examples using a total of 5.4 moles of ethanol for 1 atom of aluminum metal, the proportion of water used corresponded to 4% or somewhat less of the weight of the alcohol or approximately half a mole of water for 1 Al in the product (see Example 1). The addition of a part only of the water at the beginning of the reaction decreases the tendency to form precipitated by-products during the reaction. Such precipitate, when formed, is considered to include a large proportion of alumina or aluminum hydroxide.

The softeners, when used, are introduced in the proportion of about 5–35 parts for 100 of solids in the solution of the complex.

The following empirical formula shows suitable ranges of proportions of the several components of the product and values for $n$, $x$, $y$, and $z$ above:

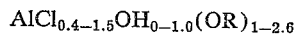
$$AlCl_{0.4-1.5}OH_{0-1.0}(OR)_{1-2.6}$$

the sum of the proportions of Cl, OH, and OR within these ranges being 3. For best solubility and stability of solutions of the product in alcohol and like solvents, the proportion of OH should be 0.25–1.

A representative reaction for making the complex may be expressed as follows:

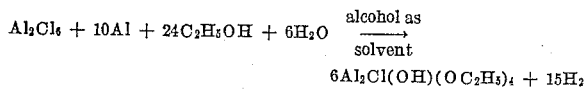
$$Al_2Cl_6 + 10Al + 24C_2H_5OH + 6H_2O \xrightarrow[\text{solvent}]{\text{alcohol as}} 6Al_2Cl(OH)(OC_2H_5)_4 + 15H_2$$

The number of units of the aluminum chlorhydroxyethylate associated in a single unit or molecule of the complex is not known. Also it is not material to the invention whether the composition is a chemical compound in the usual sense or a bonding of components through coordinate valences or other form of association.

The invention will be further illustrated by description in connection with the following examples. In the examples and elsewhere herein proportions are expressed as parts by weight except when specifically stated to the contrary.

*Example 1.—Chlorhydroxyalcoholate complex*

10.7 g. of anhydrous aluminum chloride were dissolved in 100 g. of ethanol-denatured alcohol, formula 3A anhydrous. 1 ml. of water was introduced. The whole was stirred with 10.8 g. of aluminum powder under a reflux condenser. The materials reacted exothermically, the temperature not rising above 75° C. When the reaction rate became slow, 1 ml. of additional water was added. The addition of water stimulated the reaction. After the reaction subsided again, a second increment of 1 ml. water was added. Finally, a third 1 ml. increment was added to the reaction.

The reactants were refluxed for a minimum of 16 hours. The temperature rises to 79° C. at the end of the refluxing. The resulting mixture was filtered to remove any undissolved material present including any insoluble methylate complex. The excess of ethanol solvent was removed by evaporation under vacuum.

The product on analysis showed aluminum (calc. at $Al_2O_3$) 38.0% and chlorine (calc. as Cl) 13.6%. The complex is represented approximately by the empirical formula $Al_2Cl(OH)(OC_2H_5)_4$.

*Example 2.—Chloralcoholate*

In this example no water was used.

36.4 g. of anhydrous aluminum chloride were dissolved in 100 g. of ethanol 3A anhydrous in a 500 ml. flask with reflux condenser and stirrer. 14.8 g. of aluminum powder were added. After the exothermic reaction had subsided, the whole was heated and refluxed for a minimum of 16 hours. The product appeared as insoluble material. The mixture was evaporated under vacuum, to remove volatiles, particularly alcohol.

The product analyzed as follows: $Al_2O_3$ 37.0%, Cl 23.7%. It is useful for purposes not requiring solution in ethanol.

*Example 3.—Bromo complexes*

For each mole of aluminum chloride used in Examples 1 and 2, 1 mole of anhydrous aluminum bromide was substituted and the procedure of Examples 1 and 2, used in turn. The products are the aluminum bromohydroxyalcoholate and bromalcoholate complexes, respectively.

*Example 4.—Iodo complexes*

The procedures of Examples 1 and 2 are followed except that anhydrous aluminum iodide is substituted, on an equimolar basis, for the aluminum chloride. The products are aluminum iodohydroxyalcoholate and iodoalcoholate complexes, respectively.

*Example 5.—Other alcoholates*

The procedures of Examples 1–4 are followed except that the alcohol there used is substituted by equimolar proportions of methanol, n-propanol, isopropanol, or t-butanol and the filtration is omitted. Methanol gives an insoluble product, n-propanol a partly soluble product, isopropanol a soluble but unstable product, and t-butanol an insoluble product, the solubilities being in anhydrous ethanol.

The products are of the empirical formula $Al_n(Cl)_x(OH)_y(OR)_z$ where $n$, $x$, $y$, and $z$, and R have the meanings stated above and R is the alkyl group of the particular alcohol selected as starting material.

*Example 6.—Antiperspirant*

An aerosol type antiperspirant was prepared by dissolving aluminum chlorhydroxyethylate complex in an equal weight of anhydrous ethanol. This solution was then dissolved in its weight of an aerosol agent, in this case Genetron 100.

The final solution was used as an astringent, in an under-arm antiperspirant. It was effective and also satisfactory on fabric, in this case cotton.

*Example 7*

To the final solution of Example 6, we added 4 parts by weight of dipropylene glycol for 100 parts of the said solution. The dipropyleneglycol is a softening agent for the film left on evaporation of the whole solution.

*Example 8*

The procedure of any of the Examples 1 and 3–5 is followed with the addition of any of the softeners herein disclosed in the proportion 5–35 parts for 100 parts of the solids in alcoholic solution of the aluminum chlorhydroxyalcoholate complex. The film left on evaporation, either of the said solutions or of the solution after being thinned with an aerosol type solvent, is softened moderately by the added softener.

*Example 9*

An alcohol solution of any of alcohol soluble complexes made as described, as for instance in Examples 1 and 3–5, is mixed with water in proportion to precipitate the aluminum chlorhydroxyalcoholate complex as a gel. Thus we have added 50 parts of water to a solution of 25 parts (solids weight) of aluminum chlorhydroxyethylate complex made as described in Example 1, in 25 parts of ethanol. A gel formed as soon as the mixing was effected. How much of the water enters the actual structure of the complex is not known.

It will be understood that it is intended to cover all changes and modifications of the examples of the invention herein chosen for the purpose of illustration which do not constitute departures from the spirit and scope of the invention.

What we claim is:

1. An aluminum chlorhydroxyalcoholate complex containing components in the proportions represented by the empirical formula $$AlCl_{0.4-1.5}(OH)_{0.25-1}(OR)_{1-2.6}$$

in which R is a $C_1$–$C_8$ alkyl and the sum of the number of Cl atoms and of the OH and OR groups, selected from the ranges shown by the subscript figures, is 3.

2. An aluminum chlorhydroxyalcoholate characterized by solubility in anhydrous ethanol and being of the empirical type formula $$AlCl_{0.4-1.5}(OH)_{0.25-1}(OC_2H_5)_{1-2.6}$$

the sum of the numbers of Cl atoms and of the OH and $OC_2H_5$ groups, selected from the ranges shown by the subscript figures, being 3.

3. The aluminum chlorhydroxyalcoholate complex of claim 1 including an admixed softener therefor, the softener being a substantially non-volatile, alcohol soluble polyhydric alcohol.

4. A composition of matter comprising the complex of claim 1, an anhydrous alcohol solvent therefor, a substantially non-volatile polyhydric alcohol softener for the complex, and a propellent solvent of vapor pressure above atmospheric at ordinary temperatures, the complex, alcohol, softener, and said solvent being in the form of a solution.

5. In making an aluminum chlorhydroxyalcoholate complex, the process which comprises forming a mixture of aluminum in finely divided form, aluminum chloride, water, and an alcohol, in the proportions of 4–12 atoms of the finely divided aluminum and 1–2.9 moles of the alcohol for each mole of the aluminum chloride ($Al_2Cl_6$) and 2%–6% of water on the weight of the alcohol, maintaining contact between the four reactants until a substantial part of the chlorine of the aluminum chloride is replaced by hydroxy and alcoholate groups, and then discontinuing the reaction before all of the chlorine is so replaced, the water increasing the speed of the reaction and causing the resulting complex to have a substantial hydroxy content.

6. In making a gel, the process which comprises dissolving the aluminum chlorhydroxyalcoholate complex of claim 3 in a water soluble alcohol and mixing water therewith in amount to cause formation of a gel.

7. The process of claim 5 which includes maintaining the temperature of the mixed reactants at a point not substantially above 75° C. until the exothermic reaction subsides.

8. An aluminum complex comprising aluminum, a halogen selected from the group consisting of chlorine, bromine, and iodine, and hydroxy and alcoholate groups, the halogen, hydroxy, and the alcoholate groups being joined to the aluminum, and the complex containing for each atom of aluminum 0.4–1.5 atoms of the halogen, 0.25–1 hydroxyl group and 1–2.6 alcoholate groups, the sum of the number of chlorine atoms and hydroxyl and alcoholate groups being 3 for each atom of aluminum.

References Cited in the file of this patent

UNITED STATES PATENTS

| 2,571,030 | Govett et al. | Oct. 9, 1951 |
| 2,656,321 | Hunter et al. | Oct. 20, 1953 |

FOREIGN PATENTS

| 695,421 | Great Britain | Aug. 12, 1953 |

OTHER REFERENCES

C. A. Thomas: Anhydrous Aluminum Chloride in Organic Chemistry, Reinhold Pub. Co., 1941, p. 618.

U. S. DEPARTMENT OF COMMERCE

PATENT OFFICE

CERTIFICATE OF CORRECTION

Patent No. 2,823,169                                      February 11, 1958

Peter M. Brown, Jr., et al.

It is hereby certified that error appears in the printed specification of the above numbered patent requiring correction and that the said Letters Patent should read as corrected below.

Column 3, line 18, the formula should appear as shown below instead of as in the patent--

$$AlCl_{0.4-1.5}OH_{0.25-1.0}(OR)_{1-2.6}$$

Signed and sealed this 22nd day of April 1958.

(SEAL)
Attest:

KARL H. AXLINE                                                    ROBERT C. WATSON

Attesting Officer                                        Commissioner of Patents